US009607579B2

(12) United States Patent
Potts et al.

(10) Patent No.: US 9,607,579 B2
(45) Date of Patent: *Mar. 28, 2017

(54) PERSONAL INFORMATION DEVICE ON A MOBILE COMPUTING PLATFORM

(75) Inventors: John F. L. Potts, Phoenix, AZ (US); Lawrence A. Booth, Jr., Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 455 days.

This patent is subject to a terminal disclaimer.

(21) Appl. No.: 13/469,991

(22) Filed: May 11, 2012

(65) Prior Publication Data

US 2012/0262479 A1    Oct. 18, 2012

Related U.S. Application Data

(63) Continuation of application No. 09/997,201, filed on Nov. 28, 2001, now Pat. No. 8,181,118.

(51) Int. Cl.
| | |
|---|---|
| *G06F 3/14* | (2006.01) |
| *G06F 3/048* | (2013.01) |
| *G06F 3/0481* | (2013.01) |
| *G06F 3/0488* | (2013.01) |
| *G09G 5/14* | (2006.01) |
| *G09G 5/12* | (2006.01) |
| *G09G 5/393* | (2006.01) |

(52) U.S. Cl.
CPC ............. *G09G 5/14* (2013.01); *G06F 3/1438* (2013.01); *G09G 5/393* (2013.01); *G06F 3/048* (2013.01); *G06F 3/0481* (2013.01); *G06F 3/04886* (2013.01); *G06F 2203/04803* (2013.01); *G09G 5/12* (2013.01); *G09G 2340/14* (2013.01)

(58) Field of Classification Search
CPC .... G06F 3/048; G06F 3/0481; G06F 3/04886; G06F 2203/04803; G06F 3/1438; G09G 5/14; G09G 5/12; G09G 5/393; G09G 2340/14
USPC ................................. 715/781, 792, 864, 866
See application file for complete search history.

(56) References Cited

U.S. PATENT DOCUMENTS

| | | |
|---|---|---|
| 5,274,753 A | 12/1993 | Roskowski et al. |
| 5,673,403 A | 9/1997 | Brown et al. |
| 5,793,957 A | 8/1998 | Kikinis et al. |
| 5,818,425 A | 10/1998 | Want et al. |
| 6,401,013 B1 | 6/2002 | McElreath |
| 6,545,862 B1 | 4/2003 | Gettemy et al. |
| 6,571,342 B1 | 5/2003 | Detlef |
| 7,292,588 B2 * | 11/2007 | Milley et al. .................. 370/401 |

(Continued)

OTHER PUBLICATIONS

Hayhoe, G., "From Desktop to Palmtop: Creating Usable Online documents for Wireless and Handheld Devices", IEEE-IPCC, Santa Fe, NM, Oct. 24-27, 2001, pp. 1-12.

(Continued)

*Primary Examiner* — Ting Lee
(74) *Attorney, Agent, or Firm* — Pillsbury Winthrop Shaw Pittman LLP

(57) ABSTRACT

A method and apparatus for integrating a personal information device (PID) on a mobile computer that includes activating a first mode to display data originating with the PID in a first display area of a display. The mobile computer switches to a second mode to display data associated with the second mode in a second display area of the display.

33 Claims, 3 Drawing Sheets

(56) References Cited

U.S. PATENT DOCUMENTS

| | | |
|---|---|---|
| 2001/0048738 A1 | 12/2001 | Baniak |
| 2002/0033836 A1 | 3/2002 | Smith |
| 2002/0100045 A1 | 7/2002 | Rafey et al. |
| 2002/0152372 A1 | 10/2002 | Cole et al. |
| 2003/0038844 A1 | 2/2003 | Royalty |
| 2003/0041206 A1 | 2/2003 | Dickie |

OTHER PUBLICATIONS

Schaumann, J., "Software Development for the Palm OS", [Online] Aug. 6, 2000, http://www.netmeister.org/palm/PalmMisc.pdf, retrieved on Jan. 11, 2006.

* cited by examiner

PERSONAL INFORMATION DEVICE ON A MOBILE COMPUTING PLATFORM

CROSS-REFERENCE TO RELATED APPLICATIONS

This application is related to and claims the benefit under 35 U.S.C. 120 of U.S. application Ser. No. 09/997,201, filed on Nov. 28, 2001, the entire contents of which is incorporated herein by reference.

BACKGROUND

This invention relates to a personal information device (PID) on a mobile computing platform.

A mobile computer, such as a laptop computer, can include an operating system (OS) that is loaded from an external storage device such as a hard disk. As a result, the OS may take a relatively long time to power-up compared to the time its takes to power-up an OS in a PID. In addition, the mobile computer typically includes a portable power source, such as a battery, and electronic components such as peripherals, a processor, and a display screen that may place a large demand on the power source.

On the other hand, a PID, such as a personal digital assistant (PDA), can be a low cost computing device that includes a low power processor with the capability of executing an operating system (OS) directly from flash random access memory (RAM) to allow the PID to power up quickly. The PID can execute application programs such as an electronic mail (EMAIL) program and/or calendaring program and can display data associated with such application programs on a display that is smaller than a conventional mobile computer.

DETAILED DESCRIPTION

Figure 1:
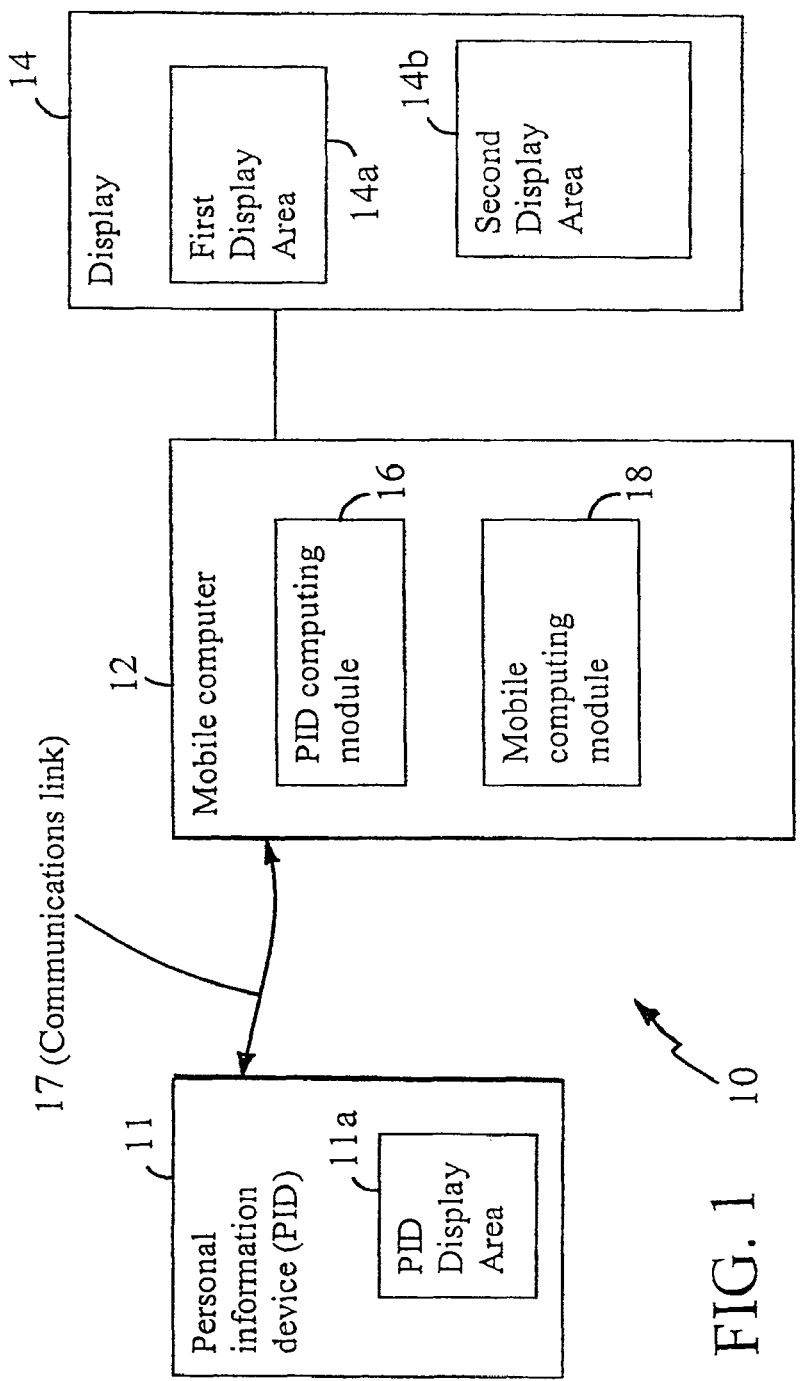
FIG. 1 is a block diagram of a computer system.

FIG. 1 shows a computer system 10 that includes a mobile computer 12, such as a laptop computer, coupled to a source of PID data such as a PID 11. The PID 11 can be a PDA, such as a Palm™ IIIc handheld PDA, capable of displaying data in a PID display area 11a from application programs executing on the PID such as an EMAIL program, a calendaring program or other application programs. The PID 11 can exchange data with the mobile computer 12 through the use of a first computing module ("PID computing module") 16 over a communications link 17 using, for example, wireless communications technology.

The mobile computer 12 can operate in a first mode through the use of the first computing module 16. The first computing module 16 includes software and hardware components. In the first mode, the first computing module 16 emulates operation of the PID 11 on the mobile computer 12. Emulation can include executing application programs similar to the programs executed on the PID 11 and managing PID data received from the PID. For example, the first computing module 16 can execute an EMAIL program using PID data from the PID 11 and display the data on a first display area 14a.

The mobile computer 12 can operate in a second mode using a second computing module ("mobile computing module") 18 that handles the overall operation of the mobile computer. The mobile computer 12 can run application programs, such as a Web browser, and display data associated with the application program on a second display area 14b. The operation of the second mode is similar to the operation of a conventional laptop computer.

The mobile computer 12 has the capability of powering up in the first mode with little delay compared to the second mode. The active area of the first display area 14a can be made smaller than the active area of the second display area 14b. As a result, operating in the first mode may consume less power per unit time than operating in the second mode. The mobile computer 12 can switch between the first mode and the second mode in response to certain events.

The display 14 is coupled to the mobile computer 12 and can have configurable display active areas such as a first display area 14a and a second display area 14b. The size of the active area of the first display area 14 may be approximate the size of the PID display area 11a of the PID 11 (FIG. 1) such as 4×5 inches. The size of the active area of the first display area 14a may be smaller than the size of the second display area 14b which may have dimensions of approximately 12×15 inches. The size of the display areas can be configured dynamically, for example, by setting size parameters in a user profile file stored in the data storage device 30. Although the first display area 14a and the second display area 14b are shown as separate display areas, the two areas can overlap.

The display 14 can be implemented, for example, as a liquid crystal display (LCD), an organic light emitting diode (OLED) or other display technologies. In general, power consumption of the display 14 is proportional to an active area of the display. The active area may be defined as the display area that is rendering an image and thus consuming power. As a result, it is preferable to use the first display area 14a when the mobile computer is operating in the first mode and to use the second display area 14b during the second mode of operation. As discussed above, during the first mode of operation, the first computing module 16 emulates a PID which typically would only require the use of the first display area 14a to display data. In the second mode of operation, it may be necessary to use the larger second display area 14b.

Figure 2:
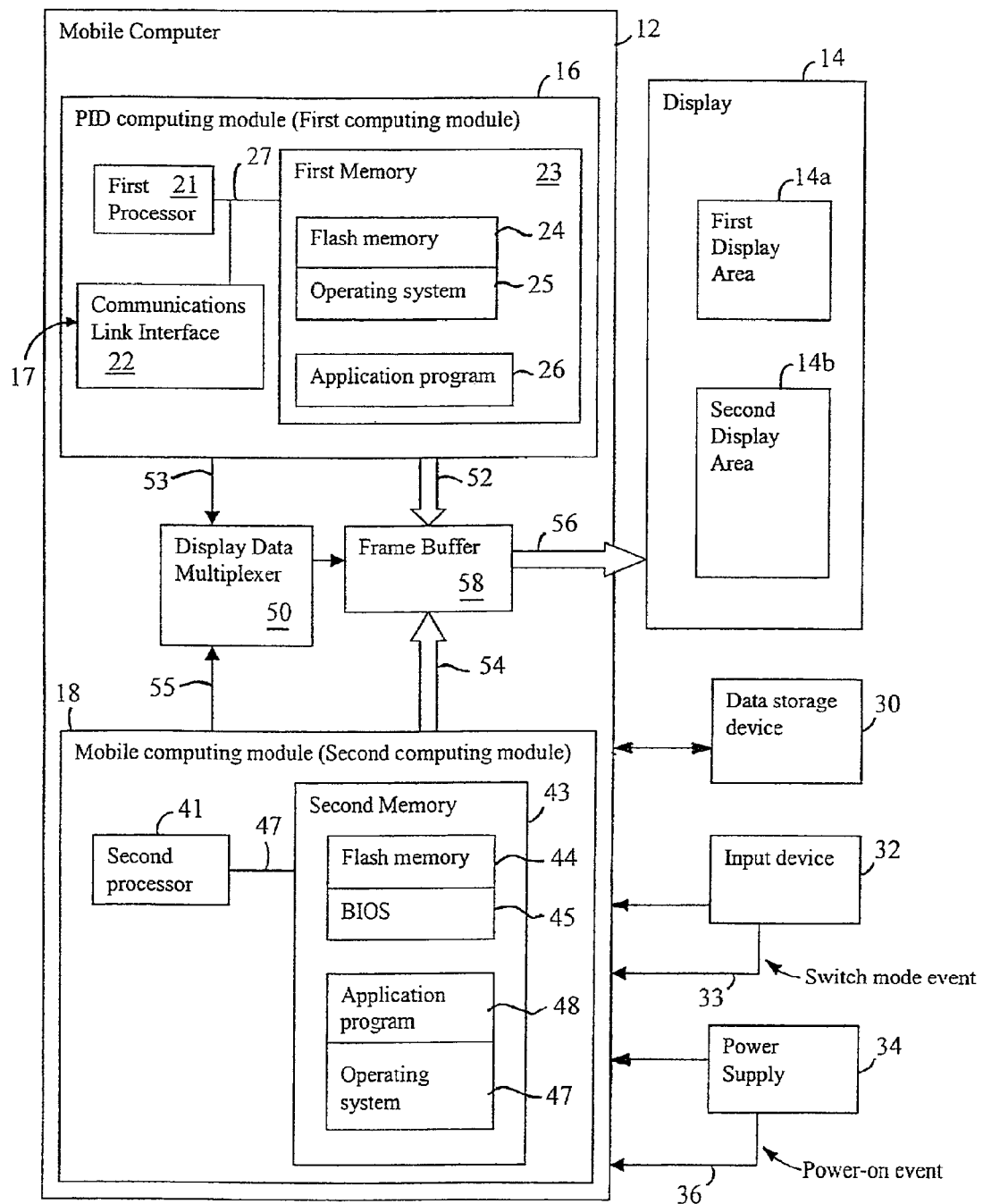
FIG. 2 is a block diagram of a mobile computing device.

As shown in FIG. 2, the mobile computer 12 includes the first computing module 16 having a first processor 21, such as an Intel® StrongARM processor, coupled to a first memory 23 through a bus 27 such as an Intel® Personal Internet Client Architecture (Intel PCA). The first memory 23 includes flash memory 24, such as flash RAM, to store an operating system (OS) such as Microsoft@ Pocket PC 2002 OS. The first processor 21 executes application programs 26 stored in the first memory 23. Such application programs 26 can include Microsoft® Outlook which contains EMAIL and calendaring functionality.

A communications link interface 22, which is coupled to the first processor 21 through the bus 27, includes hardware and software components configured to exchange data between the first computing module and the PID 11 over the communications link 17. The data can include PID data from the PID 11 which can be stored in the memory 23 for subsequent retrieval and display in the first display area 14a. The data can be changed by the first computing module 16 and then sent to the PID 11 over the communication link 17 to facilitate synchronization of PID data between the PID and the mobile computer 12.

The communications link interface 22 can be implemented using wireless techniques such as a wireless local area network (LAN) including the IEEE 802.11 standard or Bluetooth protocols, a wireless wide area network (WAN) including global system for mobile communication (GSM)/ general packet radio system (GPRS) and wideband code-division multiple access (W-CDMA)/universal mobile telecommunications service (UMTS) interfaces, or other wireless techniques. Alternatively, the communications link interface 22 can be implemented using wired techniques such as using a synchronization port in which the PID 11 is physically coupled to the port to allow data to be exchanged between the PID and the mobile computer 12.

The second computing module 18 includes a second processor 41, such as an Intel® Pentium processor, coupled to a second memory 43 through a bus 47. The second memory 43 includes a flash memory 44, such as flash RAM, to store programs such as a basic input output system (BIOS) program 45. The BIOS program 45 can act as an intermediary between the second processor 41 and input/output (I/O) devices such as the input device 32. The BIOS program 45 can include software instructions used by the mobile computer 12 during a boot up event, for example, when the mobile computer is powered on.

The second processor 41 can execute application programs 48 stored in the second memory 43. Such application programs 48 can include Microsoft® Office, a Web-browser such as Microsoft® Internet Explorer or other application programs. The second processor 41 also can execute an operating system 47 stored in the second memory 43, in the data storage device 30, or both. An operating system 47, such as Microsoft® 2000 OS, can manage the overall operation of the second computing module 18. The application programs 48 make use of services offered by the operating system 47 by making requests for these services through a defined application program interface (API).

A data storage device 30 is coupled to the mobile computer 12 and can provide external storage capacity to the mobile computer. For example, the data storage device 30 can include a hard disk, a floppy disk, a compact disk read only memory (CD-ROM), an optical drive or other storage device. An input device 32 also is coupled to the mobile computer 12 and can allow data to be entered into the mobile computer by a user. For example, the input device 32 can include a keyboard, a touch pad, a track ball, a mouse, a touch screen display or other device.

A power supply 34 is coupled to mobile computer 12 and provides a source of power to the mobile computer. The power can originate from a rechargeable lithium battery, from an alternating current (AC) source using an AC adapter connected to a conventional AC electrical outlet, or from another source of power. A power-on event 36 represents a signal indicating that the power supply is turned on and providing power to the mobile computer 12. The power-on event 36 can cause the mobile computer 12 to operate in the first mode.

A switch mode event 33 represents a signal from an input device 32 that can cause the mobile computer 12 to switch from one operating mode to another operating mode. For example, if the mobile computer is operating in the first mode, then the switch mode event 33 would cause the mobile computer to switch to the second mode of operation. In one implementation, the second computing module 18 is adapted to interpret a specific keyboard function key sequence as a switch mode event. The BIOS program 45 can be modified to include instructions that cause the switch mode event 33 to be generated when a specific function key of the keyboard is detected.

If the mobile computer 12 is operating in the first mode, then the application program 26 executing on the first computing module 16 generates first images 52 which are sent to a frame buffer 58. The first computing module 16 sends control signals 53 to a display data multiplexer 50 to cause the first images 52 stored in the frame buffer 58 to be sent as display images 56 to the first display area 14a.

Similarly, if the mobile computer 12 is operating in the second mode, then the application program 48 executing on the second computing module 18 generates second images 54 which are sent to the frame buffer 58. The second computing module 18 sends control signals 55 to the display data multiplexer 50 to cause the second images 54 stored in the frame buffer 58 to be sent as display images 56 to the second display area 14b.

The frame buffer 58 can be implemented, for example, as video RAM (VRAM) to store the first images 52 and second images 54. The frame buffer 58 acts as a buffer between the computing modules 16, 18 and the display 14. The VRAM can be dual-ported allowing the computing modules 16, 18 to write to the VRAM while at the same time allowing the display 14 to read the images from the VRAM. Other memory implementations for the frame buffer 58 can include synchronous graphics RAM (SGRAM), window RAM (WRAM), multibank dynamic RAM (MDRAM), Rambus dynamic RAM (RDRAM).

The external physical characteristics of the mobile computer may be similar to the characteristics of a conventional laptop computer such as a Dell™ latitude LS laptop. For example, the mobile computer 12 may have a base portion upon which a keyboard is placed and a lid portion in which the display 14 is placed. The inside of the base portion can house a motherboard that contains the computing modules 16, 18. During normal operation, the mobile computer 12 can be in an open position in which the base portion is substantially perpendicular to the lid portion. The mobile computer 12 also can be in a closed position in which the lid portion folds onto the base portion.

Figure 3:
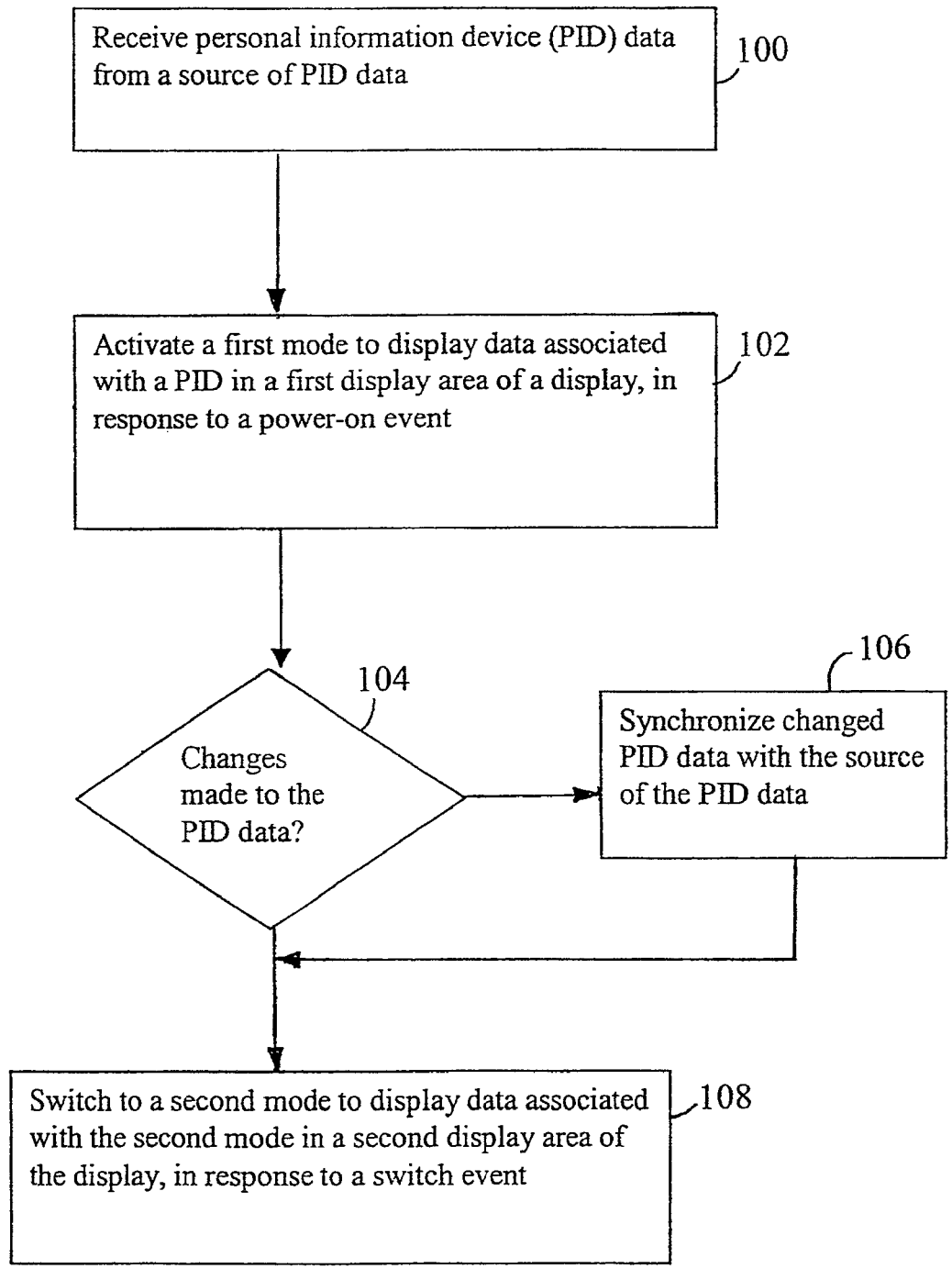
FIG. 3 is a flow chart illustrating the operation of a mobile computing device.

As shown in FIG. 3, the mobile computer 12 can receive 100 PID data from the PID 11 over the communications link 17. The PID data can be received during the first mode and/or the second mode of operation and is stored in the data storage device 32, the first memory 23, the second memory 43 or other storage location. The PID data can include application program-related data such as EMAIL data, calendaring data, contact information data, or other application program related data.

The mobile computer 12 is activated 102 to operate in the first mode and to display the PID data in the first display area 14a. Activation can occur in response to a power-on event 36 which can be generated in response to an event such as turning on the power supply or opening a lid portion of the mobile computer. Activation of the first mode occurs quickly because the OS is loaded from flash RAM instead of a hard disk. The mobile computer 12 can be configured to have a default mode such that it automatically operates in the first mode in response to a power-on event 36.

Once the mobile computer 12 is operating in the first mode, changes 104 can be made to the PID data. For example, an application program, such as an EMAIL program, can be executed using data from the PID 11. The EMAIL program may allow a user to read EMAIL messages and to create EMAIL messages to be sent at a later time.

Once the changes have been made to the PID data, the data can be synchronized 106 with the PID 11. The synchronization process can be performed during the first mode or the second mode of operation. The process may include sending the changed PID data to the PID 11 over the communications link 17. In another implementation, the synchronization process can include using techniques such as ColdSync in which the mobile computer 12 can synchronize the PID data with the source of the PID data over a network connection while the power supply is shut off.

The mobile computer 12 switches 108 to a second mode to display data associated with the second mode in the second display area 14b. Switching to the second mode can occur in response to the switch mode event 33. The switch mode event 33 can be generated at the input device 32 by performing a function such as activating a specific key of a keyboard, depressing a dedicated switch on the mobile computer, or other function.

Using the foregoing techniques, the functionality of a PID can be integrated into a mobile computer 12 permitting the mobile computer to emulate a PID. The resources of the mobile computer, such as power supply, display, keyboard, computer housing can be shared with the first computing module 16 which provides the PID functionality. As a consequence, the cost of integrating PID functionality, such as EMAIL and calendaring, into the mobile computer can be reduced. The first computing module 16 can be implemented using a low power processor and can include software adapted to use a portion 14a of the display 14. As a result, the power consumption of the first computing module 16 can be reduced which may extend the life of a portable power supply such as a battery.

The first computing module 16 can be configured to operate in the first mode by loading an operating system (OS) to permit the mobile computer to provide functionality similar to a PID. By loading an OS from flash RAM 24 instead of a hard drive, the mobile computer can boot up the OS with minimal time delay. In addition, the mobile computer can switch dynamically between a first mode and a second mode in response to a switch mode event such as entering a function key on a keyboard. In the second mode, the mobile computer 12 uses a second computing module 18 which can perform the conventional functions of a laptop computer. The conventional functions include using the full display 14, running high end applications such as Autodesk® AutoCAD®, running full power OS such as Microsoft® 2002.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the following claims.

What is claimed is:

1. A method comprising:
   operating in a first mode of a mobile computing device to emulate an operation of a personal information device (PID) communicatively associated with the mobile computing device, the operating in the first mode including executing a first application using data originating with the PID, and providing a first control signal to a display-data multiplexer to cause a first set of images stored in a frame buffer related to the first application to be displayed in a first display area of a display of the mobile computing device; and
   response to an input to switch to a second mode of the mobile computing device, switching to the second mode including executing a second application using data originating within the mobile computing device and providing a second control signal to the display-data multiplexer to cause a second set of images stored in the frame buffer related to the second application to be displayed in a second display area of the display.

2. The method of claim 1 including receiving the PID data over a communications link.

3. The method of claim 1 including operating in the first mode in response to a power-on event.

4. The method of claim 1 including switching between the first mode and the second mode in response to a mode event.

5. The method of claim 1 including synchronizing changes to the PID data with the source of the PID data including sending changed PID data to the PID.

6. The method of claim 1, wherein emulating the operation of the PID comprises reproducing a processing function of the PID.

7. An apparatus comprising:
   a display having a first display area and a second display area;
   a display-data multiplexer;
   a frame buffer;
   a first computing module coupled to the display, the first computing module comprising a first processor configured to:
     operate in a first mode of the apparatus to emulate an operation of a personal information device (PID) communicatively associated with the apparatus, wherein, in the first mode, the first computing module is configured to execute a first application using data received from the PID and provide a first control signal to the display-data multiplexer to cause a first set of images stored in the frame buffer related to the first application to be displayed in the first display area; and
   a second computing module coupled to the display, the second computing module comprising a second processor configured to:
     receive an input to switch to a second mode of the apparatus, and
     responsive to the input, switch to the second mode, wherein, in the second mode, the second computing module is configured to execute a second application using data originating within the apparatus and provide a second control signal to the display-data multiplexer to cause a second set of images stored in the frame buffer related to the second application to be displayed in the second display area of the display.

8. The apparatus of claim 7 wherein the second processor is configured to process a power on event to cause the activation of the first mode.

9. The apparatus of claim 7 wherein the second processor is configured to process a mode event that causes a switch between the first mode and the second mode.

10. The apparatus of claim 7 wherein the PID data is received over a communications link.

11. The apparatus of claim 7 wherein the first processor consumes less power per unit time than the second processor.

12. The apparatus of claim 7 wherein the size of the first display area is smaller than the size of the second display area.

13. The apparatus of claim 7 wherein the PID data includes electronic mail (EMAIL) data.

14. The apparatus of claim 7 wherein the display includes an organic light emitting diode.

15. The apparatus of claim 7 wherein the first or second processor is configured to synchronize changes to the PID data with a source of the PID data by sending changed PID data to the PID.

16. The apparatus of claim 7 wherein the display is shared by the first computing module and the second computing module.

17. The apparatus of claim 7, wherein emulating the operation of the PID comprises reproducing a processing function of the PID.

18. An article comprising a non-transitory computer-readable storage medium that stores computer-executable instructions for causing a computer system to:
   operate in a first mode of a mobile computing device to emulate an operation of a personal information device (PID) communicatively associated with the mobile computing device, wherein operating in the first mode includes executing a first application using data originating with the PID, and providing a first control signal to a display-data multiplexer to cause a first set of images stored in a frame buffer related to the first application to be displayed in a first display area of a display of the mobile computing device; and
   responsive to an input to switch to a second mode of the mobile computing device, switch to the second mode that includes executing a second application using data originating within the mobile computing device and providing a second control signal to the display-data multiplexer to cause a second set of images stored in the frame buffer related to the second application to be displayed in a second display area of the display.

19. The article of claim 18 including instructions for causing the computer to: operate in the first mode in response to a power-on event.

20. The article of claim 18 including instructions for causing the computer to: switch between the first mode and the second mode in response to a mode event.

21. The article of claim 18 including instructions for causing the computer to: synchronize changes to the PID data with a source of the PID data by sending changed PID data to the PID.

22. The article of claim 18, wherein emulating the operation of the PID comprises reproducing a processing function of the PID.

23. A system comprising:
   a source of personal information device (PID) data; and
   a computing device coupled to the source of the PID data, the computing device comprising:
      a display having a first display area and a second display area, a display data multiplexer;
      a frame buffer;
      a first computing module coupled to the display, the first computing module comprising a first processor coupled to a first memory, the first processor configured to:
         operate in a first mode of the computing device to emulate an operation of the source of the PID data, wherein, in the first mode, the first processor is configured to execute a first application using the PID data and provide a first control signal to the display-data multiplexer to cause a first set of images stored in the frame buffer related to the first application to be displayed in the first display area, and
      a second computing module coupled to the display, the second computing module comprising a second processor coupled to a second memory, the second processor configured:
         receive an input to switch to a second mode of the computing device, and
         responsive to the input, switch to the second mode, wherein, in the second mode, the second processor is configured to execute a second application using data originating within the computing device and provide a second control signal to the display-data multiplexer to cause a second set of images stored in the frame buffer related to the second application to be displayed in the second display area of the display.

24. The system of claim 23 wherein the second processor is configured to process a power-on event that causes the activation of the first mode.

25. The system, of claim 23 wherein the second processor is configured to process a mode event that causes a switch between the first mode and the second mode.

26. The system of claim 23 wherein the source of the PID data is coupled to the apparatus over a communications link.

27. The system of claim 23 wherein the first processor consumes less-power per unit time than the second processor.

28. The system of claim 23 wherein the first display area is smaller than the size of the second display area.

29. The system of claim 23 wherein the PID data includes electronic mail (EMAIL) data.

30. The system of claim 23 wherein the display includes a organic light emitting diode.

31. The system of claim 23 wherein changes to the PID data are synchronized with the source of the PID data by sending changed PID data to the source from the computing device.

32. The system of claim 23 wherein the display is shared between the first computing module and the second computing module.

33. The system of claim 23, wherein emulating the operation of the PID comprises reproducing a processing function of the PID.

* * * * *